(12) United States Patent
Nguyen et al.

(10) Patent No.: US 12,123,242 B2
(45) Date of Patent: Oct. 22, 2024

(54) METHOD FOR CONTROLLING AN ELECTRIC SLIDING DOOR IN A TRANSPORTATION VEHICLE

(71) Applicant: VOLKSWAGEN AKTIENGESELLSCHAFT, Wolfsburg (DE)

(72) Inventors: Tuan Minh Nguyen, Berlin (DE); Dirk Sikora, uml o+ee ningen (DE); Sönke Detlefsen, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 167 days.

(21) Appl. No.: 18/097,093

(22) Filed: Jan. 13, 2023

(65) Prior Publication Data
US 2023/0228142 A1   Jul. 20, 2023

(30) Foreign Application Priority Data
Jan. 14, 2022   (DE) .................... 10 2022 200 365.9

(51) Int. Cl.
*E05F 15/662*   (2015.01)
*B60J 5/06*   (2006.01)
(Continued)

(52) U.S. Cl.
CPC ............. *E05F 15/659* (2015.01); *B60J 5/062* (2013.01); *E05F 15/662* (2015.01);
(Continued)

(58) Field of Classification Search
CPC . E05F 15/662; B60J 5/062; H02P 3/18; H02P 5/753; H02K 7/1166
See application file for complete search history.

(56) References Cited

U.S. PATENT DOCUMENTS

| 10,767,413 B2 | 9/2020 | Klingbeil | |
|---|---|---|---|
| 2008/0079373 A1* | 4/2008 | Melfi | H02P 3/18 318/63 |

(Continued)

FOREIGN PATENT DOCUMENTS

| CN | 110792352 A | 2/2020 |
|---|---|---|
| CN | 212837303 U | 3/2021 |

(Continued)

*Primary Examiner* — Cortez M Cook
(74) *Attorney, Agent, or Firm* — Barnes & Thornburg LLP (57) ABSTRACT

A method for driving an electromechanical sliding door in a transportation vehicle, wherein the sliding door has an adjusting mechanism with a rolling carriage guided in a guide rail and a first electric drive motor. A fixing mechanism with a second electric drive motor and also a locking mechanism is also provided, which locking mechanism allows the rolling carriage to be arrested in any desired position. Here, the locking mechanism is driven by the second electric drive motor. The method may include driving the second electric drive motor with an input voltage which lies below a threshold voltage for tripping the locking mechanism, continuously increasing the input voltage for the second electric drive motor, and locking the locking mechanism when the input voltage for the second electric drive motor exceeds the threshold voltage for tripping the locking mechanism.

18 Claims, 4 Drawing Sheets

(51) Int. Cl.
   *E05F 15/659* (2015.01)
   *H02K 7/116* (2006.01)
   *H02P 5/753* (2006.01)

(52) U.S. Cl.
   CPC ............ *H02K 7/1166* (2013.01); *H02P 5/753* (2013.01); *E05Y 2201/408* (2013.01); *E05Y 2201/434* (2013.01); *E05Y 2201/64* (2013.01); *E05Y 2201/684* (2013.01); *E05Y 2400/302* (2013.01); *E05Y 2400/41* (2013.01); *E05Y 2400/44* (2013.01); *E05Y 2800/422* (2013.01); *E05Y 2900/531* (2013.01)

(56) References Cited

U.S. PATENT DOCUMENTS

| | | |
|---|---|---|
| 2018/0183361 A1 | 6/2018 | Kadoya et al. |
| 2020/0031207 A1 | 1/2020 | Henes |
| 2021/0062565 A1 | 3/2021 | Joko et al. |

FOREIGN PATENT DOCUMENTS

| | | | | |
|---|---|---|---|---|
| DE | 102012025096 A1 | 6/2014 | | |
| DE | 102017220326 A1 | 5/2019 | | |
| DE | 102018125644 A1 | 4/2020 | | |
| DE | 102019107716 A1 | 10/2020 | | |
| DE | 102019121351 A1 | 2/2021 | | |
| DE | 102020207837 A1 | 12/2021 | | |
| DE | 102020121519 A1 | 2/2022 | | |
| DE | 102020210230 A1 * | 2/2022 | ............ | E05F 15/662 |
| JP | 2009293643 A | 12/2009 | | |
| JP | 2018014863 A | 1/2018 | | |

* cited by examiner

METHOD FOR CONTROLLING AN ELECTRIC SLIDING DOOR IN A TRANSPORTATION VEHICLE

CROSS REFERENCE AND PRIORITY CLAIM

This patent application claims priority to German Patent Application No. 10 2022 200 365.9, filed Jan. 14, 2022, the disclosure of which being incorporated herein by reference in its entirety.

FIELD

Disclosed embodiments relate to a method for driving an electric sliding door in a transportation vehicle.

BACKGROUND

In transportation vehicles, sliding doors serve to allow extremely convenient access to the passenger compartment or transportation compartment. Particularly in the case of tight parking situations, sliding doors provide the advantage over conventional transportation vehicle doors that they have only a minimal space requirement and in particular damage to the door itself and also to other transportation vehicles is reliably prevented. In addition, a sliding door can create a particularly large opening in a vehicle side face, as a result of which particularly simple exit from and entry into the passenger compartment or particularly simple loading of a transportation compartment is possible.

SUMMARY

Disclosed embodiments minimize the development of noise when arresting an electromechanical sliding door, and increase convenience. This is achieved by a method for driving an electromechanical sliding door in a transportation vehicle, wherein the sliding door has an adjusting mechanism with a rolling carriage guided in a guide rail and a first electric drive motor. A fixing mechanism with a second electric drive motor and also a locking mechanism is also provided, which locking mechanism allows the rolling carriage to be arrested in any desired position. Here, the locking mechanism is driven by the second electric drive motor.

BRIEF DESCRIPTION OF THE FIGURES

The disclosed embodiments will be explained below using exemplary embodiments with reference to the associated drawings, in which.

DETAILED DESCRIPTION

One disadvantage of conventional, mechanical sliding doors is that opening and closing them requires a relatively large amount of force and the noise produced when opening and closing them is considerably louder than in the case of conventional transportation vehicle doors.

Electrically driven sliding doors considerably increase convenience since, in particular, the mechanical opening and closing of the doors by the passengers, this being associated with exertion of force, is dispensed with. In addition, the noise produced during opening and closing was able to be reduced using electromechanical sliding doors.

Electromechanical sliding doors can be automatically opened and closed as the customer requires. In so doing, the sliding door is moved along a guide rail via a rolling carriage by an electric drive. The rolling carriage is pulled by traction cables which are wound up on a cable drum. The cable drum is rotated by the electric drive motor of the electromechanical sliding door, possibly with the interposition of a gear mechanism. In order to arrest the sliding door in any desired position, a brake element is engaged.

JP 2018-14863 A discloses a control system for an electromechanical sliding door in a transportation vehicle, where the electromechanical sliding door has a trapping-prevention means and where the control system distinguishes between a fault in the electric drive and an actual trapping event of the sliding door.

However, one disadvantage of the known solution is that arresting the electromechanical door is associated with an increased development of noise.

Disclosed embodiments are directed at minimizing the development of noise when arresting an electromechanical sliding door, and increasing convenience. This is achieved by a method for driving an electromechanical sliding door in a transportation vehicle, wherein the sliding door has an adjusting mechanism with a rolling carriage guided in a guide rail and a first electric drive motor. A fixing mechanism with a second electric drive motor and also a locking mechanism is also provided, which locking mechanism allows the rolling carriage to be arrested in any desired position. Here, the locking mechanism is driven by the second electric drive motor.

In accordance with disclosed embodiments the method may comprise driving the second electric drive motor with an input voltage, which lies below a threshold voltage for tripping the locking mechanism, continuously increasing the input voltage for the second electric drive motor, and locking the locking mechanism when the input voltage for the second electric drive motor exceeds the threshold voltage for tripping the locking mechanism.

The method according to the disclosed embodiments enables a considerable reduction in the development of noise when arresting the electromechanical sliding door as compared with known driving of the locking mechanism with a constant voltage since the noise of the locking mechanism during locking can be considerably reduced. The convenience function of an electromechanical sliding door for the customer can be increased as a result.

Advantageous improvements to and non-trivial further developments of the method are provided for driving an electromechanical sliding door in a transportation vehicle are disclosed.

In at least one disclosed embodiment, a distinction is initially made as to whether mechanical fixing of the electromechanical sliding door is necessary at all or whether the self-locking forces of the electromechanical door are sufficient to keep the electromechanical sliding door in the current position even without additional mechanical arresting. For this purpose, in particular, an acceleration sensor or a position sensor is used on the transportation vehicle, which sensor can detect a deviation from a horizontal position of the transportation vehicle. Dispensing with mechanical arresting leads to particularly low levels of noise since in this case it is not necessary to drive the second electric drive motor and the locking mechanism does not have to be mechanically tripped either. If an inclined position of the transportation vehicle is recorded by the acceleration sensor or the position sensor because the transportation vehicle has been parked on a slope or on an incline for example, the method described is initiated when the inclined position exceeds a defined threshold value, for example a 5° slope gradient. Here, the threshold value is selected in such a way that it is at a corresponding distance from a value at which the self-locking of the electromechanical sliding door is no longer sufficient to keep the sliding door in the current position under all boundary conditions.

In an advantageous improvement to the method, provision is made for the fixing mechanism to be able to be activated by customers via an operator control point, even if the inclined position of the vehicle is less than the threshold value defined.

In a further improvement to the method, provision is made for the fixing mechanism to be activated when the detected inclined position is less than the threshold value and the control device detects an undesired movement of the electromechanical sliding door, in order to prevent a further undesired movement.

According to an advantageous refinement of the method, provision is made for the fixing mechanism to also be activated below the threshold value in the inclined position of the transportation vehicle when a defined time interval has elapsed, in order to prevent the fixing mechanism and/or the locking mechanism becoming jammed due to corrosion. As an alternative to a defined time interval, such activation can also be actuated after a defined number of opening operations of the electromechanical sliding door.

In another refinement, provision may be made for the second electric drive motor to be braked after the locking mechanism is tripped. Owing to the second electric drive transportation vehicle being braked after the locking mechanism is tripped, the noise can be reduced once again since, in particular, a strong pulse when the locking mechanism strikes an end stop and a locking element is prevented.

Optionally, the input voltage of the second electric drive motor is reduced immediately after the locking mechanism is tripped. A reduction in the input voltage of the second electric drive motor leads to braking of this drive motor and therefore to lower acceleration of the components of the locking mechanism. Therefore, the pulse in the event of striking can be reduced and the noise associated with it can be minimized.

In a further refinement, provision may be made for a current flowing through the second electric drive motor to be continuously measured.

In a further optional refinement, provision may be made for the input voltage to be linearly increased starting from a starting voltage which lies below the threshold voltage. Owing to continuous measurement of the current through the second electric drive motor, a tripping event of the locking mechanism, in particular tilting of a tilting spring, can be reliably detected, and therefore an additional microswitch for identifying the locking status can be dispensed with.

According to at least one embodiment, provision is made for a braking voltage which has an electric potential opposite to the input voltage to be applied after the locking mechanism is tripped. As a result, particularly efficient braking of the second electric drive motor and the components of the locking mechanism accelerated by the second electric drive motor is possible. Therefore, particularly gentle and acoustically barely audible locking of the locking mechanism is achieved.

In a further refinement, provision may be made in a first time interval for the input voltage and the current intensity of an electric current through the second electric drive motor to rise linearly starting from a starting voltage and a starting current until the locking mechanism is tripped, in a second time interval for the input voltage to be increased further, while the current intensity of the electric current through the second electric drive motor drops owing to the locking mechanism being tripped, and in a third time interval for the direction of current to be reversed and for a braking voltage with an electric potential opposite to the electric potential of the input voltage to be applied. Owing to the proposed method, the forces when the locking mechanism is triggered can be minimized, as a result of which firstly the mechanics are protected and the wear is minimized, and secondly the noise produced when the rolling carriage of the electromechanical sliding door is locked is reduced. Therefore, the service life of the locking mechanism can be increased and convenience can be improved.

According to a further improvement, in a fourth time interval, the input voltage may be increased again starting from the braking voltage, until the locking mechanism is locked in its end position. Owing to the increase in the input voltage after the tripping element of the locking mechanism is tripped, particularly secure and permanent arresting of the electromechanical sliding door in any desired position can be ensured.

In addition, in a fifth time interval, which chronologically follows the fourth time interval, the input voltage can be reduced again when the locking mechanism is reliably locked in its end position and secure and permanent arresting of the electromechanical sliding door is ensured.

In an alternative refinement, provision may be made for the second electric drive motor to be electrically short-circuited after the locking mechanism is tripped. Owing to an electrical short circuit, the second electric drive motor can likewise be braked after the tripping element of the locking mechanism is tripped, as a result of which the development of noise when the electromechanical sliding door is arrested is minimized.

A further aspect of the disclosed embodiments relate to a transportation vehicle having an electromechanical sliding door, where the electromechanical sliding door has an adjusting mechanism with a rolling carriage guided in a guide rail and a first electric drive motor and also a fixing mechanism with a second electric drive motor and a locking mechanism which allows the sliding door to be arrested in any desired position, where the locking mechanism can be driven by the second electric drive motor, and also having a control device with a memory unit and a computer unit and also a program code stored in the memory unit, where the control device is designed to execute such a method when the program code is executed by the computer unit.

Electromechanical sliding doors are used, in particular in minibuses and vans, in order to increase convenience when the sliding door is closed. In order to further increase this convenience function, the closing and locking noise of the electromechanical sliding door should also be minimized and ideally not be audible to the passengers. Owing to the method according to the disclosed embodiments, a considerable improvement in convenience can be achieved over known methods for locking the electromechanical sliding door.

The various embodiments mentioned in this application can advantageously be combined with one another, unless specifically stated otherwise.

The disclosed embodiments will be explained below using exemplary embodiments with reference to the associated drawings.

Figure 1:
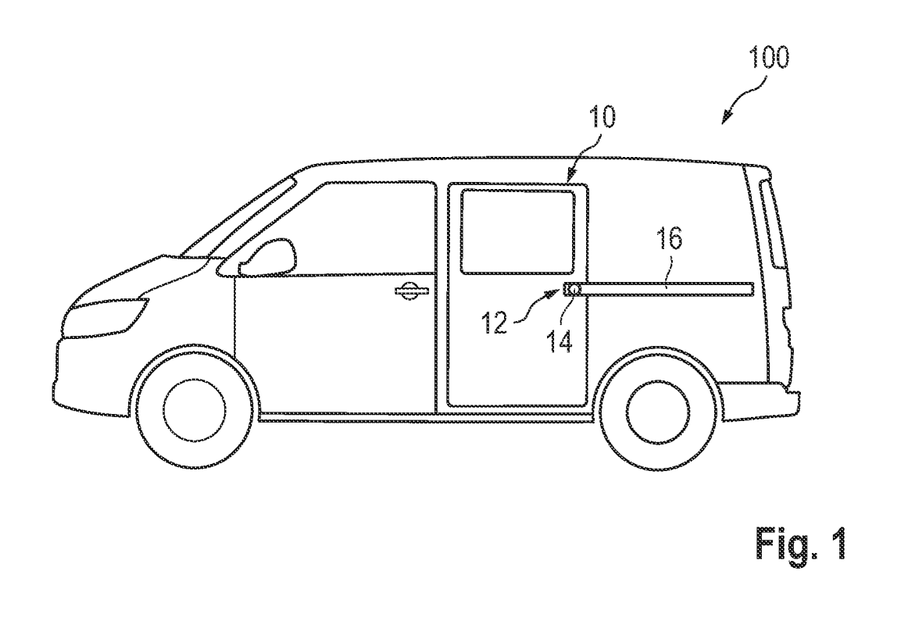
FIG. 1 shows a transportation vehicle having an electromechanical sliding door.

FIG. 1 shows a transportation vehicle 100 having an electromechanical sliding door 10. The transportation vehicle is optionally embodied as a van or minibus, where the electromechanical sliding door forms a side door, in particular a rear side door of the transportation vehicle 100. However, the inventive concept is not limited to rear side doors of passenger cars, but can also be implemented on a further motorized means of transportation, in particular transportation vehicles such as delivery vehicles, trucks and buses, rail vehicles, boats, aircraft and other transportation vehicles.

Figure 2:
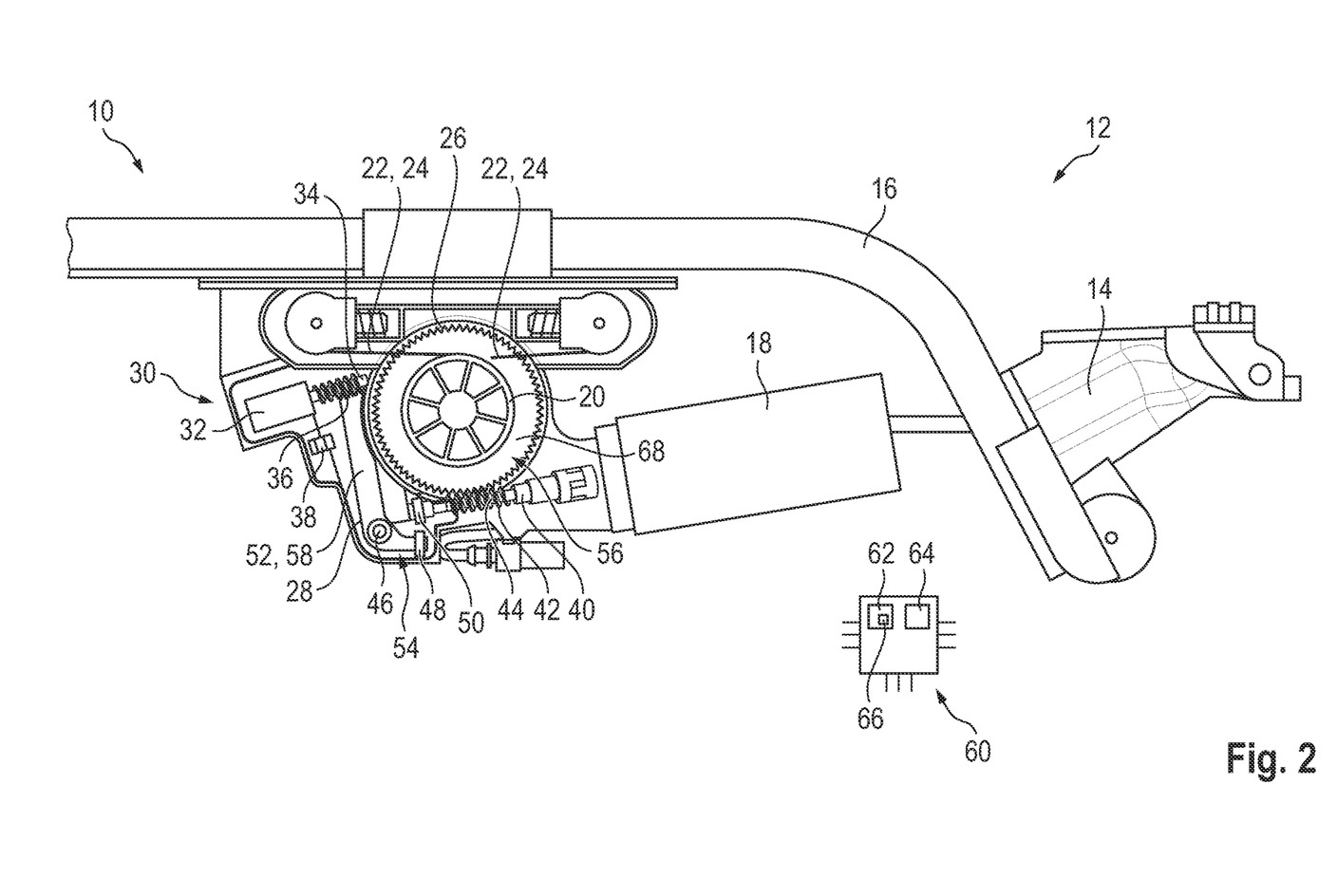
FIG. 2 shows an adjusting mechanism for an electromechanical sliding door.

FIG. 2 shows an adjusting mechanism 12 for such an electromechanical sliding door 10 in a transportation vehicle. The adjusting mechanism 12 comprises a rolling carriage 14 which is guided in a guide rail 16 in order to change the position of the electromechanical sliding door 10. The rolling carriage 14 is operatively connected to a first electric drive motor 18 which is designed to change, using suitable means, the position of the rolling carriage 14 and therefore the electromechanical sliding door 10 by way of the rolling carriage 14 being moved along the guide rail 16.

The rolling carriage 14 is pulled by traction cables 22, 24, the traction force of which is created by winding the traction cables 22, 24 around a cable drum 20. Here, the cable drum 20 is rotated by an electric drive shaft 40 which is operatively connected to the first electric drive motor 18. For this purpose, the first electric drive motor 18 is connected to a drive shaft 40 on which a helical tooth system 42 is formed. The helical tooth system 42 engages with a tooth system 26 on a toothed gear 68 connected in a rotationally fixed manner to the cable drum 20 and forms a gear mechanism 56, in particular a worm gear mechanism 44. A first traction cable 22 and a second traction cable 24 are wound onto the cable drum 20, with rotation of the cable drum 20 in a first direction of rotation causing the first traction cable 22 to be unwound and the second traction cable 24 to be wound up and moving the rolling carriage 14 to the right in the plane of the drawing. Rotating the cable drum 20 in a second direction of rotation oriented opposite to the first direction of rotation causes the first traction cable 22 to be wound up and the second traction cable 24 to be unwound and moves the rolling carriage 14 to the left in the plane of the drawing.

The adjusting mechanism 12 of the electromechanical sliding door 10 further comprises a fixing mechanism 30 which comprises a second electric drive motor 32, a tripping element 58 and a locking mechanism 54. The second electric motor drive motor 32 is connected to a motor shaft 34 on which a tooth system 36 is formed. The tooth system 36 engages with a tripping element 58, in particular a tilting spring 52, where the tripping element 58 can be tripped by driving the second electric drive motor 32. The tripping element 58 is operatively connected to a locking mechanism 54. The locking mechanism 54 comprises a rubber pad 48 which is pressed onto a brake gear 50 by the tripping element 58 or by a component connected to the tripping element 58. The brake gear 50 is fixedly connected to the motor shaft 40. The static friction between the rubber pad 48 and the brake gear 50 securely holds the motor shaft 40. As a result, the gear mechanism 44, 56 is securely held in the current position and therefore rotation of the cable drum 20 is blocked. Therefore, the rolling carriage 14 is fixed in the current position and the electromechanical sliding door 10 is securely held in this position. The adjusting mechanism 12 further comprises a microswitch 38 which is switched by actuating the tripping element 58, so that the position of the microswitch 38 can be used to read whether the electromechanical sliding door is currently in an arrested position or is freely movable by the first electric drive motor 18 and the rolling carriage 14.

In order to securely hold the electromechanical sliding door 10 in any desired position, a damping element 48, in particular a rubber pad, is pressed onto the brake gear 50. The static friction between the damping element 48 and the brake gear 50 defines the holding force which securely holds the electromechanical drive of the sliding door 10 in the current position. For this purpose, the damping element 48 is rotated about a pivot point 46 via a fixing lever 28 by the tripping element 58. The fixing lever 28 is pressed down by rotating the second electric drive motor 32, where the tooth system 34 engages with a tooth system at one end of the fixing lever 28. If the second electric drive motor 32 of the fixing mechanism 30 rotates in a first direction of rotation, the fixing lever 28 is applied and the electromechanical sliding door 10 is securely held in its current position. If the second electric drive motor 32 rotates in a second direction opposite to the first direction of rotation, the fixing lever 28 is released and the sliding door 10 can be moved freely. The current status of the securing mechanism 30 can be read out via the microswitch 38.

When the fixing lever 38 is applied and released, the force applied by the second electric drive motor 32 has to overcome the resistance force of the tripping element 58, in particular of the tilting spring 52. The function of the tilting spring 52 is to hold the fixing lever 38 in the desired fixed or released position and also to ensure sufficient pressure force and therefore sufficient static friction between the rubber pad 48 and the brake gear 50 in the fixed position, this in turn resulting in a holding force even when the second electric drive motor 32 is no longer energized. Therefore, permanent energization of the second electric drive motor 32 can be dispensed with. A further advantage of this adjusting mechanism 12 is that the electromechanical sliding door 10 can be held in all positions, this being a functional advantage for camping vehicles in particular.

The adjusting mechanism 12 additionally comprises a control device 60 with a memory unit 62 and a computer unit 64, with a machinable-readable program code 66 which can be executed by the computer unit 64 being stored in the memory unit 62.

One requirement of this adjusting mechanism 12 is that the tripping moment to be applied by the second electric drive motor 32, as under all conditions, in particular even at low temperatures or given soiling of the adjusting mechanism, has to be greater than the tripping moment of the tripping element 58. After the tripping element 58 is overcome, the mechanical resistance of the tripping element 58 changes suddenly. The large amount of force of the second electric drive motor 32 leads, in conjunction with the tripping force of the tripping element 58, to a sharp acceleration of the fixing lever 28. As a consequence, the fixing lever 28 would strike the brake gear 50 with a high pulse after the tripping element 58 is tripped or strike an end stop when released. In the process, a loud, unpleasant noise would be created, and this would be unacceptable for a convenience function such as an electromechanical sliding door 10.

Figure 3:
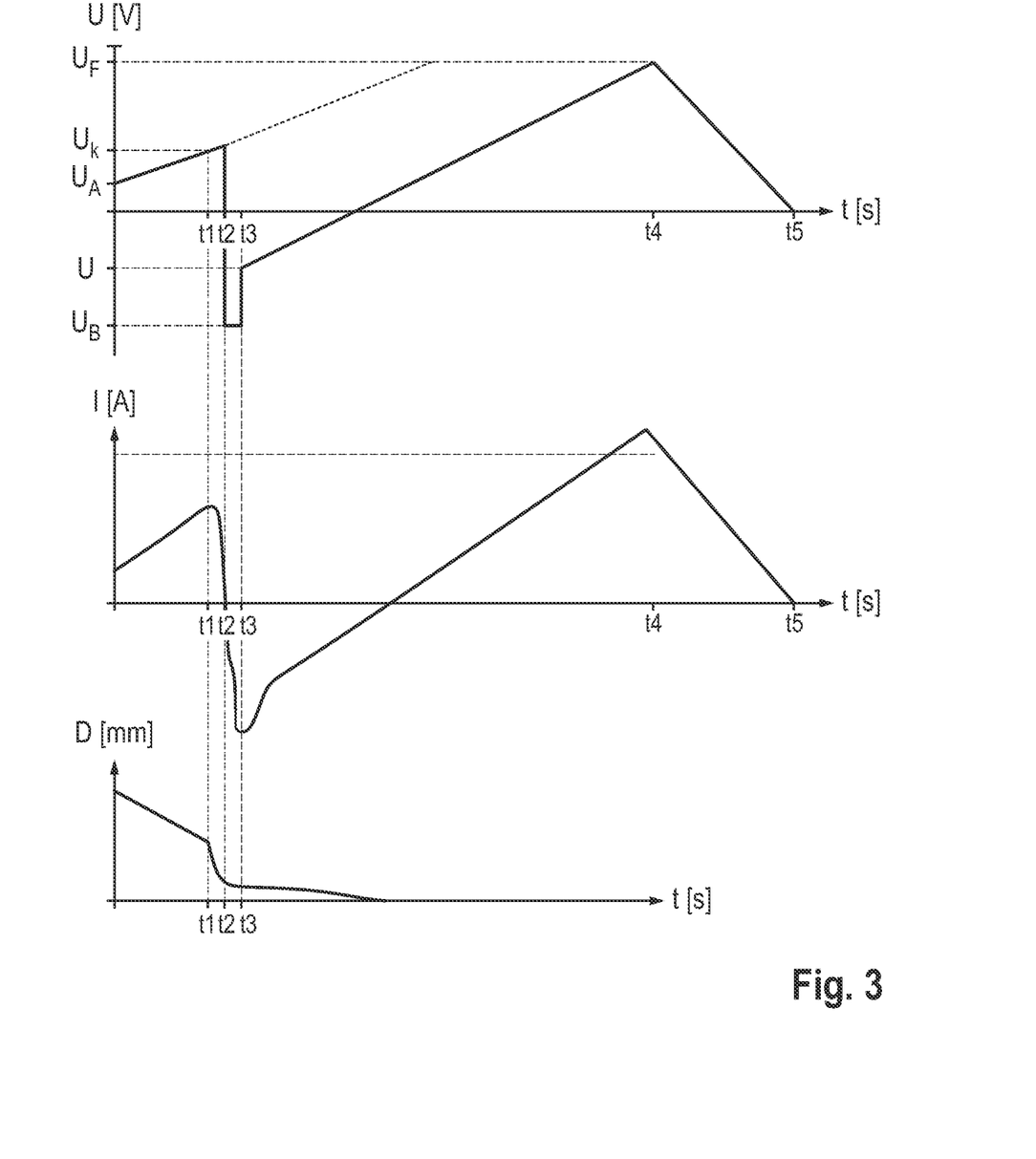
FIG. 3 shows a graph for driving an electromechanical sliding door in a method according to the invention for driving the sliding door.

In order to improve the acoustic behavior when applying and releasing the fixing mechanism 30, disclosed embodiments provide a method in which the fixing mechanism is driven in a special manner in order to minimize the development of noise when the electromechanical sliding door is fixed. For this purpose, as illustrated in FIG. 3, the second electric drive motor 32 of the fixing mechanism 30 is driven with a variable input voltage UE. The input voltage UE is linearly increased starting from a starting voltage UA. Owing to the low initial input voltage UE, which is not sufficient to overcome the tripping moment of the tripping element 58, the second electric drive motor 32 initially moves slowly. The tripping element 58, which is embodied as a tilting spring 52, is compressed, with the resistance force of the tilting spring 52 rising. If the motor force of the second electric drive motor 32 exceeds the tilting moment of the tilting spring 32, the tilting spring 52 tips over and the fixing lever 28 securely holds the rolling carriage 14 in the desired position.

The proposed method has two positive effects here. Firstly, the low input voltage UE and the associated low motor force of the second electric drive motor 32 lead to the motor force for overcoming the tilting moment of the tilting spring 52 being able to be kept comparatively low under normal operating conditions, in particular ambient temperatures of 15° C. to 35° C. The lower the input voltage UE, the lower the acceleration of the fixing lever 28 and therefore the pulse of the fixing lever 28 during striking. Owing to the lower pulse during striking, the noise when actuating the fixing mechanism 30 is reduced. If the tilting moment of the tilting spring 52 or a tripping moment of the tripping element 58 is increased at low temperatures or due to soiling of the fixing mechanism 30 and therefore a higher input voltage UE is required at the second electric drive motor 32, this higher tripping voltage Uk is also reliably achieved. As a result, the robustness of the arresting function is increased and in most operating states a considerable improvement in the acoustic behavior of the fixing mechanism 30 is achieved.

Secondly, the fixing lever 28 initially moves slowly on account of the low motor force and the resistance force of the tilting spring 52. Since the spring force acts against the motor force up to the tilting moment, the resulting force on the fixing lever 28 likewise remains low, this in turn leading to a slow movement of the fixing lever 28. The direction of the spring force changes only after the tilting time of the tilting spring 52 has been passed. The fixing lever 28 is therefore sharply accelerated only starting from when the tilting moment of the tilting spring 52 has been overcome. Since the acceleration travel, that is to say the distance, starting from the tilting time, from the brake gear 50 during blocking or from the end stop during release, is however substantially smaller than in the case of constant energization of the second electric drive motor 32 with a high input voltage, the fixing lever 28 experiences a considerably lower pulse when it strikes the brake gear 50. Therefore, the noise when actuating the fixing mechanism 30 is considerably reduced.

In order to further reduce the noise, the second electric drive motor 32 is braked after the tripping element 58 is tripped, optionally after the tilting spring 52 is tripped. As a result, the acceleration on the fixing lever 28 is also minimized or the movement of the fixing lever 28 is braked. In order to brake the second electric drive motor 32, the effect of the induction voltage is used in order to detect the tilting time of the tilting spring 52. For this purpose, the current flowing through the second electric drive motor 32 of the fixing mechanism 30 is monitored by a control device 60. The ratio between applied voltage UE and motor current IM is represented by the equation of the DC machine:

$$U(t)=R*i(t)+L*di(t)/dt+k*w(t) \qquad (I)$$

$$\rightarrow I(t)=U(t)-L*di(t)/dt-k*w(t) \qquad (II)$$

where
U (t) is the applied voltage at time t
R is resistance of the armature
L is the inductance of the coil
IM(t) is the motor current
k is a motor constant
and w is the rotation speed of the second electric drive motor 32 at time t.

In the starting phase up to the tilting time, the second electric drive motor 32 moves slowly, as described, on account of the low motor torque and the resistance force of the tilting spring 52, both of which rise linearly. Therefore, the term k*w(t) is also negligibly small in proportion to the low motor speed. If the applied voltage U (t) slowly linearly increases, the motor current IM(t) also linearly rises to the voltage U (t). The term L*di (t)/dt is virtually constant in this case.

Starting from the tilting time, the spring force acts in the same direction as the motor force. The high resulting force as a sum of the two forces leads to sharp acceleration of the fixing lever 28 after the tilting time. The drastically rising motor speed leads to a very large term of k*w(t) in terms of magnitude. As a consequence, the motor current IM(t) rapidly drops in accordance with equation (II), even though the applied voltage UE continues to be linearly increased.

This effect can be utilized in order to detect the tilting time. If the control device 60 suddenly identifies a dropping motor current IM after the linear rising phase at the start, even though the applied voltage UE at the second electric drive motor 32 continues to be linearly increased, this means that the tilting spring 52 is tilted and the second electric drive motor 32 is accelerated.

In order to further improve the acoustic behavior, the control device 60 can brake the second electric drive motor 32 immediately after the tilting time instead of continuing to accelerate it due to an increased voltage. The applied voltage UE, the measured current IM and the travel of the fixing lever 28 are illustrated in FIG. 3.

From the beginning of driving t0, the applied voltage UE is linearly increased from the starting voltage UA in the direction of the end voltage UF by the control device 60. The starting voltage UA is selected such that the motor force created as a result is lower than the spring force of the tilting spring 52 in the fixed or released position. Therefore, the second electric drive motor 32 and the fixing lever 28 do not yet start to move. The end voltage UF is selected such that, at UF, the tilting spring reliably tilts under all operating conditions and therefore application and release of the fixing lever 28 are ensured. Here, the motor current IM is read by the control device 60 and compared with the value at the last time. In the time from t0 to t1, the motor current IM rises linearly with the applied voltage UE as described. At time t1, the force applied by the second drive motor 32 reaches the tilting moment. The tilting spring 52 tips over and the second electric drive motor 32 accelerates due to the sudden relief of loading. The motor current IM drops drastically even though the applied voltage UE continues to be increased. At time t2, the control device 60 identifies the drop in the motor current IM and the control device 60 applies a braking voltage UB which has an electric potential in the opposite direction to the input voltage UE. As a result, the second electric drive motor is briefly braked in the time interval from t2 to t3. The braking voltage UB and the time t3 are selected, depending on the voltage at the tilting time t1, such that the short braking pulse brakes the fixing lever 28 in good time before it strikes the brake gear 50 or the end stop, but does not lead to the tilting spring tipping over again in the other direction. Starting from time t3, the voltage is linearly increased starting from the braking voltage UB, until the end voltage UF is reached, in order to move the fixing lever 28 slowly but reliably to the target position. Starting from a time t4, the voltage can be further reduced when the locking mechanism 54 has reliably arrested the rolling carriage in the current position.

Owing to the targeted braking of the second electric drive motor 32 after the tilting spring 52 is tripped, the acoustic behavior of the fixing mechanism 30 can be optimized and almost noise-free arresting of the electromechanical sliding door can be achieved.

Figure 4:
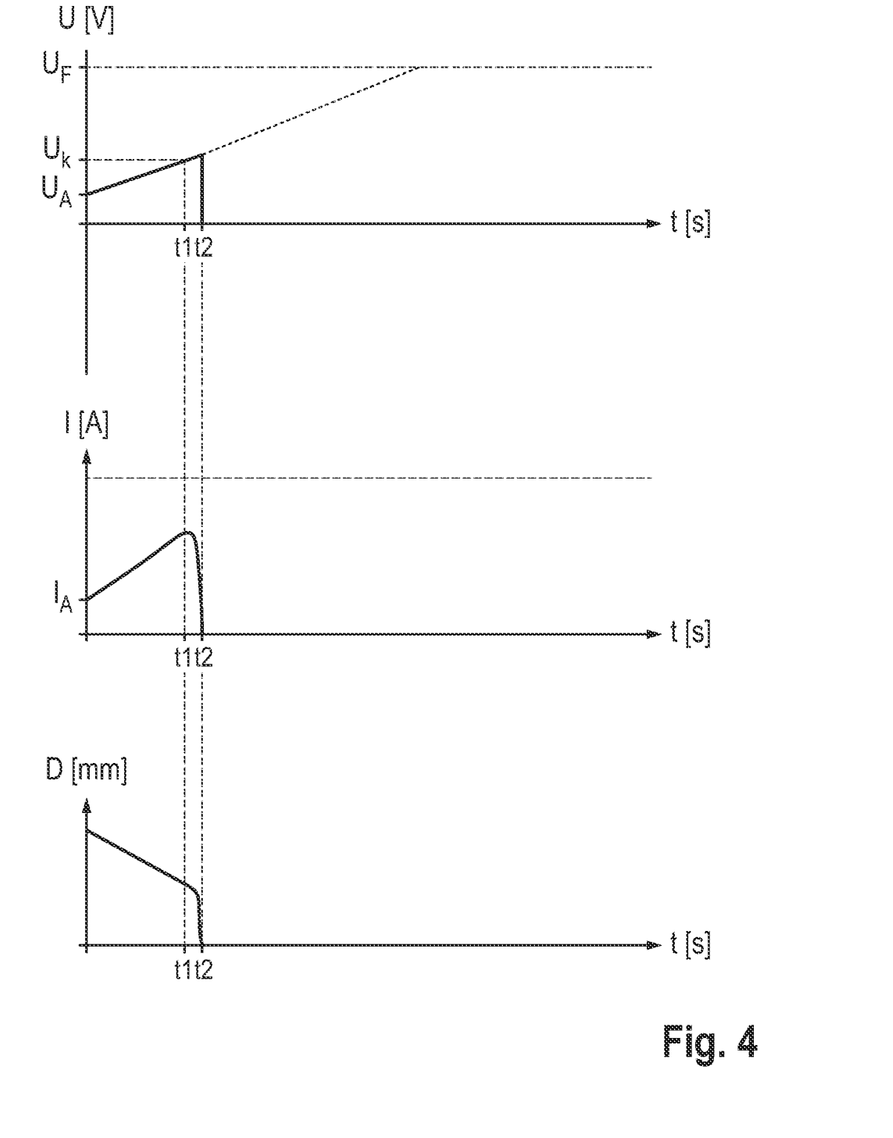
FIG. 4 shows a graph for driving an electromechanical sliding door in an alternative embodiment of a method according to the invention for driving the sliding door.

FIG. 4 shows an alternative method for driving an electromechanical sliding door 10. With substantially the same sequence, the second electric drive motor 32 is not braked in the braking phase in this exemplary embodiment by a reversal of voltage and an inverse direction of current flow, but rather by an electric short circuit of the second electric drive motor 32. If the control device 60 detects tipping over of the tilting spring 52 by identifying a dropping motor current IM, the second electric drive motor 32 is short-circuited and the braking force is achieved by electromagnetic induction.

LIST OF REFERENCE SIGNS

10 Electromechanical sliding door
12 Adjusting mechanism
14 Rolling carriage
16 Guide rail
18 Electric drive motor
20 Cable drum
22 First traction cable
24 Second traction cable
26 Tooth system
28 Fixing lever
30 Fixing mechanism
32 Drive motor
34 Motor shaft
36 Tooth system
38 Microswitch
40 Drive shaft
42 Tooth system
44 Worm gear mechanism
46 Pivot point
48 Damping element
50 Brake gear
52 Tilting spring
54 Locking mechanism
56 Gear mechanism
58 Tripping element
60 Control device
62 Memory unit
64 Computer unit
66 Program code
100 Transportation vehicle
A Ampere
D Distance
I Current intensity
$I_A$ Starting current
$I_M$ Motor current
L Inductance of the coil
k Motor constant
R Resistance of the armature
t Time
U Voltage
$U_A$ Starting voltage
$U_B$ Braking voltage
$U_P$ Input voltage
$U_F$ End voltage
$U_k$ Tripping voltage
$U_S$ Threshold voltage
V Volt

The invention claimed is:

1. A method for driving an electromechanical sliding door in a transportation vehicle, in which the sliding door has an adjusting mechanism with a rolling carriage guided in a guide rail and a first electric drive motor and also a fixing mechanism with a second electric drive motor and a locking mechanism that enables the rolling carriage to be arrested in any position, wherein the locking mechanism is driven by the second electric drive motor, wherein the method comprises:

driving the second electric drive motor with an input voltage which lies below a threshold voltage for tripping the locking mechanism;

continuously increasing the input voltage for the second electric drive motor, and locking the locking mechanism when the input voltage for the second electric drive motor exceeds the threshold voltage for tripping the locking mechanism.

2. The method of claim 1, wherein the second electric drive motor is braked after the locking mechanism is tripped.

3. The method of claim 2, wherein the input voltage of the second electric drive motor is reduced immediately after the locking mechanism is tripped.

4. The method of claim 1, wherein a current flowing through the second electric drive motor is continuously measured.

5. The method of claim 1, wherein the input voltage is linearly increased starting from a starting voltage that lies below the threshold voltage.

6. The method of claim 1, wherein a braking voltage, which has an electric potential opposite to the input voltage, is applied after the locking mechanism is tripped.

7. The method of claim 1, wherein, in a first time interval, the input voltage and the current intensity of an electric current through the second electric drive motor rise linearly starting from a starting voltage and a starting current until the locking mechanism is tripped, in a second time interval, the input voltage increases further, while the current intensity of the electric current through the second electric drive motor drops owing to the locking mechanism being tripped, and in a third time interval the direction of current is reversed and braking voltage with an electric potential opposite to the electric potential of the input voltage is applied.

8. The method of claim 7, wherein, in a fourth time interval, the input voltage is increased again starting from the braking voltage, until the locking mechanism is locked in its end position.

9. The method of claim 1, wherein the second electric drive motor is electrically short-circuited after the locking mechanism is tripped.

10. A transportation vehicle having an electromechanical sliding door, the transportation vehicle with an electromechanical sliding door comprising:

an adjusting mechanism with a rolling carriage guided in a guide rail;
a first electric drive motor;
a fixing mechanism;

a second electric drive motor;

a locking mechanism which enables the rolling carriage to be arrested in any position, wherein the locking mechanism is driven by the second electric drive motor; and a control device with a memory unit, a computer unit, and program code stored in the memory unit, wherein the control device is configured to execute a method for driving the electromechanical sliding door when the program code is executed by the computer unit, wherein the transportation vehicle includes:

driving the second electric drive motor with an input voltage which lies below a threshold voltage for tripping the locking mechanism;

continuously increasing the input voltage for the second electric drive motor, and locking the locking mechanism when the input voltage for the second electric drive motor exceeds the threshold voltage for tripping the locking mechanism.

11. The transportation vehicle of claim 10, wherein the second electric drive motor is braked after the locking mechanism is tripped.

12. The transportation vehicle of claim 11, wherein the input voltage of the second electric drive motor is reduced immediately after the locking mechanism is tripped.

13. The transportation vehicle of claim 10, wherein a current flowing through the second electric drive motor is continuously measured.

14. The transportation vehicle of claim 10, wherein the input voltage is linearly increased starting from a starting voltage that lies below the threshold voltage.

15. The transportation vehicle of claim 10, wherein a braking voltage, which has an electric potential opposite to the input voltage, is applied after the locking mechanism is tripped.

16. The transportation vehicle of claim 10, wherein, in a first time interval, the input voltage and the current intensity of an electric current through the second electric drive motor rise linearly starting from a starting voltage and a starting current until the locking mechanism is tripped, in a second time interval, the input voltage increases further, while the current intensity of the electric current through the second electric drive motor drops owing to the locking mechanism being tripped, and in a third time interval the direction of current is reversed and braking voltage with an electric potential opposite to the electric potential of the input voltage is applied.

17. The transportation vehicle of claim 16, wherein, in a fourth time interval, the input voltage is increased again starting from the braking voltage, until the locking mechanism is locked in its end position.

18. The transportation vehicle of claim 10, wherein the second electric drive motor is electrically short-circuited after the locking mechanism is tripped.

* * * * *